(12) United States Patent
Kresnyak et al.

(10) Patent No.: US 7,770,640 B2
(45) Date of Patent: *Aug. 10, 2010

(54) CARBON DIOXIDE ENRICHED FLUE GAS INJECTION FOR HYDROCARBON RECOVERY

(75) Inventors: Steve Kresnyak, Calgary (CA); Gary Bunio, Calgary (CA)

(73) Assignees: Diamond QC Technologies Inc., Calgary, Alberta (CA); Colt Engineering Corporation, Calgary, Alberta (CA); Paramount Resources Ltd., Calgary, Alberta (CA)

( * ) Notice: Subject to any disclaimer, the term of this patent is extended or adjusted under 35 U.S.C. 154(b) by 166 days.

This patent is subject to a terminal disclaimer.

(21) Appl. No.: 11/702,521

(22) Filed: Feb. 6, 2007

(65) Prior Publication Data
US 2007/0215350 A1    Sep. 20, 2007

Related U.S. Application Data

(60) Provisional application No. 60/765,749, filed on Feb. 7, 2006.

(51) Int. Cl.
*E21B 43/18* (2006.01)
(52) U.S. Cl. .................................................... 166/267
(58) Field of Classification Search ................. 166/267, 166/266, 272.1, 272.3, 272.7, 305.1, 306; 405/128.1, 129.1
See application file for complete search history.

(56) References Cited

U.S. PATENT DOCUMENTS 3,396,537 A    8/1968 Lissant et al. ................. 60/216
3,409,420 A    11/1968 Booth et al. ..................... 44/4
3,409,560 A    11/1968 Faust et al. ................. 252/309
3,458,294 A    7/1969 Nixon et al. ................... 44/51
3,490,237 A    1/1970 Lissant ......................... 60/217
3,527,581 A    9/1970 Brownawell et al. ........... 44/51
3,539,406 A    11/1970 Lissant ........................ 149/109
3,540,866 A    11/1970 Miller ............................ 44/51
3,547,605 A    12/1970 Cornelius, III et al. ........... 44/4
3,548,938 A    12/1970 Parker ......................... 166/256
3,606,868 A    9/1971 Voogd ..................... 125/25 R (Continued)

FOREIGN PATENT DOCUMENTS

CA    2 505 449    2/2006

(Continued)

OTHER PUBLICATIONS

Mitsubishi Heavy Industries, Ltd.; Masaki Iijima and Takashi Kamijo "Flue Gas CO2 Recovery and Compression Cost Study for CO2 Enhanced Oil Recovery"; Oct. 2002.

(Continued)

*Primary Examiner*—John Kreck
(74) *Attorney, Agent, or Firm*—Blake, Cassels & Graydon LLP

(57) ABSTRACT

A process for enhanced oil and gas recovery. An enriched flue gas is synthesized from utility plant flue gas. The enriched flue gas is customizable for specific requirements; however, the gas is formed to have a high concentration of carbon dioxide. This is used as an injectant for enhancing the liberation of gas and/or oil from subterranean formations. The injection elevates recovery while sequestering carbon dioxide from the power plant source.

7 Claims, 4 Drawing Sheets

U.S. PATENT DOCUMENTS

| | | | |
|---|---|---|---|
| 3,615,290 A | 10/1971 | Nixon et al. | 44/51 |
| 3,617,095 A | 11/1971 | Lissant et al. | 302/66 |
| 3,637,357 A | 1/1972 | Nixon et al. | 44/51 |
| 3,642,608 A | 2/1972 | Roach et al. | 208/8 |
| 3,658,302 A | 4/1972 | Duthion et al. | 259/18 |
| 3,672,853 A | 6/1972 | Reman et al. | 44/52 |
| 3,709,747 A | 1/1973 | Nixon et al. | 149/22 |
| 3,732,084 A | 5/1973 | Nixon et al. | 44/51 |
| 3,743,486 A | 7/1973 | Franciscovich | 44/51 |
| 3,743,555 A | 7/1973 | Seaman | 149/36 |
| 3,756,794 A | 9/1973 | Ford | 44/51 |
| 3,764,547 A | 10/1973 | Schlinger et al. | 252/184 |
| 3,816,329 A | 6/1974 | Kenney et al. | 252/312 |
| 3,846,086 A | 11/1974 | Balch et al | 44/40 |
| 3,849,323 A | 11/1974 | Hollinshead | 252/56 R |
| 3,853,497 A | 12/1974 | Miller et al. | 44/62 |
| 3,876,391 A | 4/1975 | McCoy et al. | 44/51 |
| 3,885,624 A | 5/1975 | Brown | 166/57 |
| 3,902,869 A | 9/1975 | Friberg et al. | 44/51 |
| 3,907,134 A | 9/1975 | Metzger | 44/51 |
| 3,908,762 A | 9/1975 | Redford | 166/263 |
| 3,915,970 A | 10/1975 | Limaye et al. | 260/248 |
| 4,008,924 A | 2/1977 | Gogarty et al. | 302/66 |
| 4,011,843 A | 3/1977 | Feuerman | 123/119 |
| 4,014,575 A | 3/1977 | French et al. | 299/2 |
| 4,029,360 A | 6/1977 | French | 299/2 |
| 4,030,894 A | 6/1977 | Marlin et al. | 44/51 |
| 4,061,473 A | 12/1977 | Norris | 44/51 |
| 4,069,022 A | 1/1978 | Metzger | 44/51 |
| RE29,553 E | 2/1978 | Burton, III et al. | 299/2 |
| 4,074,978 A | 2/1978 | Panzer | 44/62 |
| 4,082,516 A | 4/1978 | Metzger | 44/551 |
| 4,083,698 A | 4/1978 | Wenzel et al. | 44/51 |
| 4,084,940 A | 4/1978 | Lissant | 44/51 |
| 4,089,657 A | 5/1978 | Keller | 44/51 |
| 4,101,293 A | 7/1978 | Krause et al. | 44/51 |
| 4,115,313 A | 9/1978 | Lyon et al. | 252/309 |
| 4,116,610 A | 9/1978 | Berthiaume | 431/4 |
| 4,121,995 A | 10/1978 | Hsu | 208/8 |
| 4,127,138 A | 11/1978 | Sweeney | 137/13 |
| 4,130,400 A | 12/1978 | Meyer | 44/51 |
| 4,130,401 A | 12/1978 | Meyer et al. | 44/51 |
| 4,147,519 A | 4/1979 | Sawyer, Jr. | 44/51 |
| 4,149,854 A | 4/1979 | Kohn | 44/51 |
| 4,149,855 A | 4/1979 | Kohn et al. | 44/51 |
| 4,153,421 A | 5/1979 | Marlin | 44/51 |
| 4,156,434 A | 5/1979 | Parker et al. | 137/13 |
| 4,158,551 A | 6/1979 | Feuerman | 44/51 |
| 4,162,143 A | 7/1979 | Yount, III | 44/51 |
| 4,163,644 A | 8/1979 | Bowers | 44/51 |
| 4,165,969 A | 8/1979 | Hughes et al. | 44/51 |
| 4,171,957 A | 10/1979 | Moriyama et al. | 44/51 |
| 4,173,455 A | 11/1979 | Fodor et al. | 44/51 |
| 4,177,039 A | 12/1979 | Sakuma et al. | 44/51 |
| 4,182,613 A | 1/1980 | Stover et al. | 44/51 |
| 4,182,614 A | 1/1980 | Moriyama et al. | 44/51 |
| 4,187,078 A | 2/1980 | Shimizu et al. | 44/51 |
| 4,195,975 A | 4/1980 | Hamuro et al. | 44/51 |
| 4,199,326 A | 4/1980 | Fung | 44/51 |
| 4,201,552 A | 5/1980 | Rowell et al. | 44/51 |
| 4,203,728 A | 5/1980 | Norton | 44/51 |
| 4,203,729 A | 5/1980 | Ishizaki et al. | 44/51 |
| 4,208,251 A | 6/1980 | Rasmussen | 201/14 |
| 4,218,221 A | 8/1980 | Cottell | 44/51 |
| 4,244,700 A | 1/1981 | Chukhanov et al. | 44/1 R |
| 4,244,702 A | 1/1981 | Alliger | 44/51 |
| 4,246,000 A | 1/1981 | Kobayashi et al. | 44/51 |
| 4,251,229 A | 2/1981 | Naka et al. | 44/51 |
| 4,251,230 A | 2/1981 | Sawyer, Jr. | 44/51 |
| 4,252,540 A | 2/1981 | Yamamura et al. | 44/51 |
| 4,266,943 A | 5/1981 | Lo | 44/51 |
| 4,272,253 A | 6/1981 | Schulz et al. | 44/51 |
| 4,276,054 A | 6/1981 | Schmolka et al. | 44/51 |
| 4,288,232 A | 9/1981 | Schmolka et al. | 44/51 |
| 4,291,720 A | 9/1981 | Folland | 137/209 |
| 4,293,312 A | 10/1981 | Fox | 44/1 R |
| 4,293,313 A | 10/1981 | Fox | 44/1 R |
| 4,295,859 A | 10/1981 | Boehmke | 44/51 |
| 4,297,107 A | 10/1981 | Boehmke | 44/51 |
| 4,304,573 A | 12/1981 | Burgess et al. | 44/51 |
| 4,305,729 A | 12/1981 | Stearns | 44/51 |
| 4,306,881 A | 12/1981 | Stearns | 44/51 |
| 4,306,882 A | 12/1981 | Stearns | 44/51 |
| 4,306,883 A | 12/1981 | Eckman | 44/51 |
| 4,309,191 A | 1/1982 | Hiroya et al. | 44/51 |
| 4,309,269 A | 1/1982 | Denker et al. | 208/8 LE |
| 4,315,755 A | 2/1982 | Hellsten et al. | 44/51 |
| 4,332,593 A | 6/1982 | Burgess et al. | 44/51 |
| 4,339,246 A | 7/1982 | Yamamura et al. | 44/51 |
| 4,347,061 A | 8/1982 | Madsen et al. | 44/51 |
| 4,355,969 A | 10/1982 | Nelson et al. | 431/4 |
| 4,358,292 A | 11/1982 | Battista | 44/51 |
| 4,358,293 A | 11/1982 | Mark | 44/51 |
| 4,363,637 A | 12/1982 | Knitter et al. | 44/51 |
| 4,364,741 A | 12/1982 | Villa | 44/51 |
| 4,364,742 A | 12/1982 | Knitter et al. | 44/51 |
| 4,374,647 A | 2/1983 | Bezman | 44/56 |
| 4,377,392 A | 3/1983 | Massey et al. | 44/51 |
| 4,378,230 A | 3/1983 | Rhee | 44/51 |
| 4,382,802 A | 5/1983 | Beinke et al. | 44/51 |
| 4,389,219 A | 6/1983 | Naka et al. | 44/51 |
| 4,392,865 A | 7/1983 | Grosse et al. | 44/51 |
| 4,394,131 A | 7/1983 | Marro, Jr. et al. | 44/51 |
| 4,395,266 A | 7/1983 | Han | 44/51 |
| 4,396,397 A | 8/1983 | Kugel et al. | 44/51 |
| 4,396,400 A | 8/1983 | Grangette et al. | 44/75 |
| 4,397,653 A | 8/1983 | Longanbach | 44/51 |
| 4,398,918 A | 8/1983 | Newman | 44/51 |
| 4,400,177 A | 8/1983 | Cottell | 44/51 |
| 4,401,437 A | 8/1983 | Poetschke et al. | 44/2 |
| 4,403,996 A | 9/1983 | Matsuura et al. | 44/1 G |
| 4,406,664 A | 9/1983 | Burgess et al. | 44/51 |
| 4,412,844 A | 11/1983 | Collins et al. | 44/51 |
| 4,415,031 A | 11/1983 | Hunt, III | 166/261 |
| 4,422,855 A | 12/1983 | Sawyer, Jr. | 44/51 |
| 4,425,135 A | 1/1984 | Jenkins | 44/51 |
| 4,436,527 A | 3/1984 | Yamamura et al. | 44/51 |
| 4,441,887 A | 4/1984 | Funk | 44/51 |
| 4,441,889 A | 4/1984 | Mark | 44/51 |
| 4,441,890 A | 4/1984 | Feldman | 44/51 |
| 4,446,012 A | 5/1984 | Murthy et al. | 208/130 |
| 4,447,348 A | 5/1984 | Forsberg | 252/75 |
| 4,453,947 A | 6/1984 | Shah et al. | 44/51 |
| 4,465,494 A | 8/1984 | Bourrel et al. | 44/51 |
| 4,469,486 A | 9/1984 | Shah et al. | 44/51 |
| 4,474,578 A | 10/1984 | Cornils et al. | 44/51 |
| 4,475,924 A | 10/1984 | Meyer | 44/51 |
| 4,477,259 A | 10/1984 | Funk | 44/51 |
| 4,477,260 A | 10/1984 | Funk | 44/51 |
| 4,478,602 A | 10/1984 | Kelley et al. | 44/51 |
| 4,478,603 A | 10/1984 | Mark | 44/51 |
| 4,479,806 A | 10/1984 | Funk | 44/51 |
| 4,484,929 A | 11/1984 | Rutter et al. | 44/51 |
| 4,492,590 A | 1/1985 | Schick et al. | 44/51 |
| 4,494,960 A | 1/1985 | Dolkemeyer et al. | 44/51 |
| 4,501,205 A | 2/1985 | Funk | 110/347 |
| 4,511,364 A | 4/1985 | Mitsumori | 44/51 |
| 4,511,365 A | 4/1985 | Mark | 44/51 |
| 4,512,774 A | 4/1985 | Myers et al. | 44/51 |
| 4,526,585 A | 7/1985 | Burgess et al. | 44/51 |
| 4,529,408 A | 7/1985 | Yan | 44/51 |
| 4,530,701 A | 7/1985 | Koskan et al. | 44/51 |
| 4,547,199 A | 10/1985 | Boehmke et al. | 44/51 |
| 4,553,978 A | 11/1985 | Yvan | 44/1 E |

| Patent No. | Date | Inventor | Class |
|---|---|---|---|
| 4,555,248 A | 11/1985 | Bronfenbrenner et al. | 44/78 |
| 4,595,396 A | 6/1986 | Erdman | 44/63 |
| 4,601,729 A | 7/1986 | Capes et al. | 44/51 |
| 4,604,188 A | 8/1986 | Yan et al. | 208/106 |
| 4,605,420 A | 8/1986 | McGarry et al. | 44/1 R |
| 4,608,057 A | 8/1986 | Davis et al. | 44/51 |
| 4,610,695 A | 9/1986 | Crespin et al. | 44/51 |
| 4,618,348 A | 10/1986 | Hayes et al. | 44/51 |
| 4,622,046 A | 11/1986 | D'Intino et al. | 44/51 |
| 4,623,359 A | 11/1986 | Yaghmaie et al. | 44/51 |
| 4,623,447 A | 11/1986 | Clampitt et al. | 208/187 |
| 4,629,472 A | 12/1986 | Haney, III et al. | 44/51 |
| 4,637,822 A | 1/1987 | Niu et al. | 44/51 |
| 4,650,496 A | 3/1987 | Funk | 44/51 |
| 4,666,457 A | 5/1987 | Hayes et al. | 44/51 |
| 4,670,019 A | 6/1987 | Paspek | 44/51 |
| 4,671,800 A | 6/1987 | Meyer et al. | 44/51 |
| 4,671,801 A | 6/1987 | Burgess et al. | 44/51 |
| 4,684,372 A | 8/1987 | Hayes et al. | 44/51 |
| 4,685,936 A | 8/1987 | Meyer et al. | 44/51 |
| 4,687,491 A | 8/1987 | Latty | 44/51 |
| 4,692,270 A | 9/1987 | Sato et al. | 252/353 |
| 4,696,638 A | 9/1987 | DenHerder | 431/4 |
| 4,696,677 A | 9/1987 | Colegrove et al. | 44/51 |
| 4,704,134 A | 11/1987 | Meyer et al. | 44/51 |
| 4,705,533 A | 11/1987 | Simmons | 44/51 |
| 4,708,720 A | 11/1987 | Grangette et al. | 44/51 |
| 4,711,643 A | 12/1987 | Kemp et al. | 44/51 |
| 4,713,086 A | 12/1987 | Smit et al. | 44/51 |
| 4,725,287 A | 2/1988 | Gregoli et al. | 44/51 |
| 4,732,576 A | 3/1988 | Friedrich et al. | 44/51 |
| 4,737,158 A | 4/1988 | Antonini et al. | 44/51 |
| 4,744,797 A | 5/1988 | Shimada et al. | 44/51 |
| 4,755,325 A | 7/1988 | Osgerby | 252/314 |
| 4,756,721 A | 7/1988 | Correra et al. | 44/7.1 |
| 4,757,833 A | 7/1988 | Danley | 137/13 |
| 4,759,267 A | 7/1988 | Wang et al. | 44/51 |
| 4,770,670 A | 9/1988 | Hazbun et al. | 44/51 |
| 4,780,109 A | 10/1988 | Malone et al. | 44/51 |
| 4,787,915 A | 11/1988 | Meyer et al. | 44/51 |
| 4,793,826 A | 12/1988 | Hayes et al. | 44/51 |
| 4,795,478 A | 1/1989 | Layrisse R. et al. | 44/51 |
| 4,801,304 A | 1/1989 | Polanco et al. | 44/51 |
| 4,804,495 A | 2/1989 | Bouchez et al. | 252/312 |
| 4,821,757 A | 4/1989 | Hayes et al. | 137/13 |
| 4,824,439 A | 4/1989 | Polanco et al. | 44/51 |
| 4,832,701 A | 5/1989 | Polanco et al. | 44/51 |
| 4,832,747 A | 5/1989 | Marchal | 106/277 |
| 4,832,831 A | 5/1989 | Meyer et al. | 208/431 |
| 4,842,616 A | 6/1989 | Verhille | 44/51 |
| 4,877,414 A | 10/1989 | Mekonen | 44/51 |
| 4,886,519 A | 12/1989 | Hayes et al. | 44/51 |
| 4,892,560 A | 1/1990 | Sial | 44/50 |
| 4,907,368 A | 3/1990 | Mullay et al. | 44/51 |
| 4,908,154 A | 3/1990 | Cook et al. | 252/314 |
| 4,911,736 A | 3/1990 | Huang et al. | 44/51 |
| 4,923,483 A | 5/1990 | Layrisse R. et al. | 44/51 |
| 4,933,086 A | 6/1990 | McMahon et al. | 210/603 |
| 4,943,390 A | 7/1990 | Hayes et al. | 252/355 |
| 4,949,743 A | 8/1990 | Broom | 137/13 |
| 4,950,307 A | 8/1990 | Najjar et al. | 44/51 |
| 4,976,745 A | 12/1990 | Rodriguez et al. | 44/301 |
| 4,978,365 A | 12/1990 | Gregoli et al. | 44/301 |
| 4,978,367 A | 12/1990 | Green et al. | 44/281 |
| 4,983,319 A | 1/1991 | Gregoli et al. | 252/314 |
| 4,994,090 A | 2/1991 | Rodriguez et al. | 44/301 |
| 5,000,757 A | 3/1991 | Puttock et al. | 44/301 |
| 5,000,872 A | 3/1991 | Olah | 252/314 |
| 5,002,484 A * | 3/1991 | Lofton et al. | 432/222 |
| 5,008,035 A | 4/1991 | Broom | 252/312 |
| 5,013,462 A | 5/1991 | Danley | 252/8.554 |
| 5,024,676 A | 6/1991 | Moriyama et al. | 44/301 |
| 5,096,461 A | 3/1992 | Frankiewicz et al. | 44/281 |
| 5,097,903 A | 3/1992 | Wilensky | 166/266 |
| 5,104,418 A | 4/1992 | Genova et al. | 44/302 |
| 5,110,443 A | 5/1992 | Gregoli et al. | 208/46 |
| 5,123,931 A | 6/1992 | Good et al. | 44/281 |
| 5,133,898 A | 7/1992 | Fock et al. | 252/356 |
| 5,196,129 A | 3/1993 | Luisi | 252/49.5 |
| 5,202,056 A | 4/1993 | Sung et al. | 252/351 |
| 5,207,891 A | 5/1993 | Sung et al. | 208/44 |
| 5,217,076 A | 6/1993 | Masek | 166/303 |
| 5,234,475 A | 8/1993 | Malhotra et al. | 44/282 |
| 5,244,475 A | 9/1993 | Lownds et al. | 44/271 |
| 5,263,848 A | 11/1993 | Gregoli et al. | 431/4 |
| 5,283,001 A | 2/1994 | Gregoli et al. | 252/314 |
| 5,284,492 A | 2/1994 | Dubin | 44/301 |
| 5,288,295 A | 2/1994 | Hypes et al. | 44/301 |
| 5,296,005 A | 3/1994 | Wolfe et al. | 44/551 |
| 5,338,485 A | 8/1994 | Fock et al. | 252/309 |
| 5,344,306 A | 9/1994 | Brown et al. | 431/4 |
| 5,360,458 A | 11/1994 | Forsberg et al. | 44/301 |
| 5,372,613 A | 12/1994 | Mekonen | 44/301 |
| 5,380,343 A | 1/1995 | Hunter | 44/302 |
| 5,401,341 A | 3/1995 | Forsberg et al. | 149/46 |
| 5,411,558 A | 5/1995 | Taniguchi et al. | 44/301 |
| 5,419,852 A | 5/1995 | Rivas et al. | 252/312 |
| 5,439,489 A | 8/1995 | Scalliet et al. | 44/281 |
| 5,445,656 A | 8/1995 | Marelli | 44/310 |
| 5,454,666 A | 10/1995 | Chaback et al. | 405/32 |
| 5,478,365 A | 12/1995 | Nikanjam et al. | 44/280 |
| 5,478,366 A | 12/1995 | Teo et al. | 44/301 |
| 5,480,583 A | 1/1996 | Rivas et al. | 252/311.5 |
| 5,499,587 A | 3/1996 | Rodriquez et al. | 110/342 |
| 5,503,643 A | 4/1996 | Schriver et al. | 44/282 |
| 5,503,772 A | 4/1996 | Rivas et al. | 252/314 |
| 5,505,876 A | 4/1996 | Rivas et al. | 252/311 |
| 5,505,877 A | 4/1996 | Krivohlavek | 252/314 |
| 5,511,969 A | 4/1996 | Lopes et al. | 431/4 |
| 5,513,584 A | 5/1996 | Rodriguez et al. | 110/342 |
| 5,535,708 A | 7/1996 | Valentine | 123/25 |
| 5,551,956 A | 9/1996 | Moriyama et al. | 44/301 |
| 5,556,574 A | 9/1996 | Rivas et al. | 252/311.5 |
| 5,584,894 A | 12/1996 | Peter-Hoblyn et al. | 44/301 |
| 5,603,864 A | 2/1997 | Silva et al. | 252/311.5 |
| 5,611,824 A | 3/1997 | Stephens | 44/282 |
| 5,622,920 A | 4/1997 | Rivas et al. | 507/232 |
| 5,641,433 A | 6/1997 | Chirinos et al. | 252/312 |
| 5,669,938 A | 9/1997 | Schwab | 44/301 |
| 5,679,236 A | 10/1997 | Poschl | 205/351 |
| 5,685,153 A | 11/1997 | Dickinson et al. | 60/648 |
| 5,693,106 A | 12/1997 | Peter-Hoblyn et al. | 44/301 |
| 5,725,609 A | 3/1998 | Rivas et al. | 44/301 |
| 5,743,922 A | 4/1998 | Peter-Hoblyn et al. | 44/301 |
| 5,746,783 A | 5/1998 | Compere et al. | 44/301 |
| 5,779,990 A | 7/1998 | Iwata | 422/186.04 |
| 5,788,721 A | 8/1998 | Scalliet et al. | 44/281 |
| 5,792,223 A | 8/1998 | Rivas et al. | 44/302 |
| 5,800,576 A | 9/1998 | Johnson et al. | 44/301 |
| 5,807,476 A | 9/1998 | Collins et al. | 208/236 |
| 5,820,640 A | 10/1998 | Ikura et al. | 44/301 |
| 5,834,539 A | 11/1998 | Krivohlavek | 524/60 |
| 5,851,245 A | 12/1998 | Moriyama et al. | 44/301 |
| 5,856,680 A | 1/1999 | Shirodkar | 252/314 |
| 5,873,916 A | 2/1999 | Cemenska et al. | 44/301 |
| 5,879,419 A | 3/1999 | Moriyama et al. | 44/301 |
| 5,885,310 A | 3/1999 | Minamidate | 44/301 |
| 5,900,112 A | 5/1999 | Spontak et al. | 162/30.11 |
| 5,902,227 A | 5/1999 | Rivas | 516/54 |
| 5,902,359 A | 5/1999 | Grosse et al. | 44/281 |
| 5,925,233 A | 7/1999 | Miller et al. | 208/48 AA |
| 5,944,984 A | 8/1999 | Benguigui et al. | 208/309 |
| 5,964,906 A | 10/1999 | Layrisse et al. | 44/302 |
| 5,976,200 A | 11/1999 | Rivas et al. | 44/301 |
| 5,980,733 A | 11/1999 | Collins et al. | 208/236 |
| 5,992,354 A | 11/1999 | Ahern et al. | 123/25 |

| | | | |
|---|---|---|---|
| 5,993,495 A | 11/1999 | Sanchez et al. | 44/301 |
| 5,993,496 A | 11/1999 | Sung et al. | 44/301 |
| 5,997,590 A | 12/1999 | Johnson et al. | 44/301 |
| 5,997,591 A | 12/1999 | Matsuda et al. | 44/301 |
| 6,001,886 A | 12/1999 | Shirodkar | 516/51 |
| 6,010,544 A | 1/2000 | Haldeman et al. | 44/301 |
| 6,016,868 A | 1/2000 | Gregoli et al. | 166/261 |
| 6,017,368 A | 1/2000 | Steinmann | 44/302 |
| 6,030,424 A | 2/2000 | Matsumoto | 44/301 |
| 6,036,473 A | 3/2000 | Ichinose et al. | 431/4 |
| 6,066,186 A | 5/2000 | Matsumoto | 44/301 |
| 6,066,679 A | 5/2000 | Leviness et al. | 518/709 |
| 6,068,670 A | 5/2000 | Haupais et al. | 44/301 |
| 6,069,178 A | 5/2000 | Layrisse et al. | 516/50 |
| 6,077,322 A | 6/2000 | Shiao | 44/301 |
| 6,080,211 A | 6/2000 | Mathur | 44/301 |
| 6,113,659 A | 9/2000 | Logaraj et al. | 44/280 |
| RE36,983 E | 12/2000 | Hayes et al. | 44/301 |
| 6,183,629 B1 | 2/2001 | Bando et al. | 208/426 |
| 6,187,063 B1 | 2/2001 | Gunnerman | 44/301 |
| 6,190,427 B1 | 2/2001 | Ahmed | 44/302 |
| 6,194,472 B1 | 2/2001 | Logaraj et al. | 516/43 |
| 6,211,251 B1 | 4/2001 | Satterfield | 516/10 |
| 6,235,067 B1 | 5/2001 | Ahern et al. | 44/301 |
| 6,248,140 B1 | 6/2001 | Genssler et al. | 44/281 |
| 6,280,485 B1 | 8/2001 | Daly et al. | 44/301 |
| 6,280,486 B1 | 8/2001 | Dessauer et al. | 44/302 |
| 6,281,253 B1 | 8/2001 | Satterfield | 516/10 |
| 6,293,975 B1 | 9/2001 | Scalliet et al. | 44/281 |
| 6,294,597 B1 | 9/2001 | Wittenbrink et al. | 516/76 |
| 6,296,676 B1 | 10/2001 | Nohara | 44/301 |
| 6,306,184 B2 | 10/2001 | Ahmed | 44/302 |
| 6,325,833 B1 | 12/2001 | Berlowitz | 44/301 |
| 6,331,575 B1 | 12/2001 | Mauldin | 518/715 |
| 6,364,917 B1 | 4/2002 | Matsumura et al. | 44/301 |
| 6,368,366 B1 | 4/2002 | Langer et al. | 44/301 |
| 6,368,367 B1 | 4/2002 | Langer et al. | 44/301 |
| 6,368,368 B1 | 4/2002 | Reeves | 44/301 |
| 6,371,998 B1 | 4/2002 | Mathur | 44/301 |
| 6,375,689 B2 | 4/2002 | Marelli | 44/301 |
| 6,379,404 B1 | 4/2002 | Ru | 44/301 |
| 6,383,237 B1 | 5/2002 | Langer et al. | 44/301 |
| 6,384,091 B2 | 5/2002 | Layrisse et al. | 516/50 |
| 6,386,750 B2 | 5/2002 | Marelli | 366/152.1 |
| 6,413,361 B1 | 7/2002 | Hino et al. | 159/44 |
| 6,419,714 B2 | 7/2002 | Thompson et al. | 44/31 |
| 6,444,000 B1 | 9/2002 | Firey | 44/639 |
| 6,447,556 B1 | 9/2002 | Cemenska et al. | 44/301 |
| 6,458,855 B1 | 10/2002 | Wittenbrink et al. | 516/76 |
| 6,471,732 B1 | 10/2002 | Shimada | 44/281 |
| 6,503,286 B1 | 1/2003 | Lacaze et al. | 44/301 |
| 6,511,937 B1 | 1/2003 | Bearden, Jr. et al. | 502/180 |
| 6,530,964 B2 | 3/2003 | Langer et al. | 44/301 |
| 6,530,965 B2 | 3/2003 | Warchol | 44/301 |
| 6,530,966 B1 | 3/2003 | Kriech et al. | 44/542 |
| 6,569,909 B1 | 5/2003 | O'Reilly et al. | 518/700 |
| 6,589,301 B1 | 7/2003 | Magnin et al. | 44/301 |
| 6,595,291 B1 | 7/2003 | Lia et al. | 166/305.1 |
| 6,606,856 B1 | 8/2003 | Brown et al. | 60/299 |
| 6,607,566 B1 | 8/2003 | Coleman et al. | 44/301 |
| 6,623,535 B1 | 9/2003 | Kief | 44/301 |
| 6,638,323 B2 | 10/2003 | Tsai et al. | 44/301 |
| 6,648,929 B1 | 11/2003 | Daly et al. | 44/301 |
| 6,652,607 B2 | 11/2003 | Langer et al. | 44/301 |
| 6,656,236 B1 | 12/2003 | Coleman et al. | 44/301 |
| 6,663,680 B1 | 12/2003 | Dodd et al. | 44/301 |
| 6,677,387 B2 | 1/2004 | Gurfinkel Castillo et al. | 516/53 |
| 6,736,215 B2 | 5/2004 | Maher et al. | 166/402 |
| 6,740,133 B2 | 5/2004 | Hundley, Jr. | 44/301 |
| 6,745,831 B2 | 6/2004 | de Rouffignac et al. | 166/245 |
| 6,805,195 B2 | 10/2004 | Vinegar et al. | 166/251.1 |
| 6,808,693 B2 | 10/2004 | Arnaud et al. | 423/212 |
| 6,860,911 B2 | 3/2005 | Hundley | 44/620 |
| 6,883,607 B2 | 4/2005 | Nenniger et al. | 166/272.4 |
| 7,341,102 B2 * | 3/2008 | Kresnyak et al. | 166/267 |
| 2002/0005374 A1 | 1/2002 | Roby, Jr. et al. | 208/86 |
| 2002/0157304 A1 | 10/2002 | Warchol | 44/301 |
| 2004/0200618 A1 | 10/2004 | Piekenbrock | 166/305.1 |
| 2004/0205995 A1 | 10/2004 | Zucchelli et al. | 44/500 |
| 2004/0211554 A1 * | 10/2004 | Vinegar et al. | 166/60 |
| 2004/0253159 A1 * | 12/2004 | Hakka et al. | 423/228 |

FOREIGN PATENT DOCUMENTS

| | | |
|---|---|---|
| CA | 2505449 | 3/2007 |
| EP | 0 144 203 | 11/1984 |
| FR | 2 872 566 A1 | 12/1998 |
| WO | WO 98/55394 A | 12/1998 |
| WO | WO 99/64719 A2 | 12/1999 |
| WO | WO 01/60952 | 8/2001 |
| WO | WO 03/068368 A | 8/2003 |

OTHER PUBLICATIONS

Alstom; "Oxygen-fired Circulating Fluidized Bed (CFB) Technology Development"; Aug. 9-11, 2004; Calgary, Alberta, Canada.

SPE (Society of Petroleum Engineers); S. Doieschall, A. Szittar and G. Udvardi; "Review of the 30 Years' Experience of the CO2 Imported Oil Recovery Projects in Hungary"; SPE22362; pp. 305-317; Mar. 24-27, 1992; Beijing, China.

Emulsification A solution to Asphaltene Handling Problems, Dr. Sundaram Logaraj et al.; ISSA/AEMA 2nd Joint Conference, Mar. 12-13, 2000, Amelia Island, Florida, USA.

* cited by examiner

CARBON DIOXIDE ENRICHED FLUE GAS INJECTION FOR HYDROCARBON RECOVERY

FIELD OF THE INVENTION

The present invention relates to enhanced hydrocarbon recovery. More specifically, the present invention relates to enhanced oil and gas recovery and carbon dioxide sequestration using carbon dioxide enriched flue gas.

BACKGROUND OF THE INVENTION

Green house gas has become an escalating concern in the environment and is believed to be contributing to uncharacteristic weather patterns and temperature fluctuations.

The anthromorphic sources of carbon dioxide are largely from industrial and automobile use. In terms of the industrial source, power generation plants factor heavily into the equation. As is typical, North American plants employ coal, natural gas, fuel oil, inter alia to create high pressure steam which is then used to drive steam turbines or used in diesel and gas turbine engines directly for electric power production. This, of course, creates carbon dioxide emissions, exacerbating the emissions problem.

A number of studies and attempts have been recently developed to take advantage of the volumes of carbon dioxide for enhanced oil and gas recovery in subterranean formations. It is well known that such formations, despite having been previously produced to the most economically feasible extent still contain vast reserves of oil and gas. Flue gas injection has now provided an economically viable avenue to continue to produce from the once produced formations. As an attendant feature, carbon dioxide can be sequestered in the formation thus eliminating handling concerns and ensuring compliance with the stringent requirements of the Kyoto accord.

Enhanced hydrocarbon recovery processes use miscible and immiscible gases such as natural gas, natural gas liquids, carbon dioxide, nitrogen, or combustion flue gases that maintain pressure, repressurize or expand in a reservoir to push additional oil or natural gas to the wellbore, or use the same or other gases to dissolve in the oil to lower its viscosity and increase its flow rate.

Capture and permanent storage of carbon dioxide in geologic formations has become an increasingly popular option for sequestering carbon dioxide emissions from industrial processes and coal-fired power generation. The U.S. Government is currently developing policies to encourage geologic sequestration with the view of long-term emission reduction.

The costs related to capture of carbon dioxide from power plants, and high-purity carbon dioxide sources is high at between $20 to $200 USD per metric ton of carbon dioxide emissions. Capturing and sequestering 90 percent of the carbon dioxide from a new power plant in the United States is estimated to add $0.02 per kilowatt-hour to the cost of electricity, with 75 to 80 percent of the cost for the capture, treatment and injection. Considering that capture technology is a critical aspect of plant design, installing capture technology at existing facilities presents very high costs. The present invention not only addresses capture, but further results in economic recovery of previously uneconomically recoverable hydrocarbons and provides excess usable energy.

SUMMARY OF THE INVENTION

Accordingly, an object of the present invention is to provide an improved tertiary oil and/or gas recovery method using a $CO_2$ enriched flue gas, which method is observant of green house gas concerns. A further important object of one embodiment of the present invention is to provide a sequestration mechanism for carbon dioxide.

A further object of one embodiment of the present invention is to provide a method for enhancing oil and gas production from a subterranean formation containing at least one of gas and oil, comprising providing an energy conversion unit, recovering flue gas from the energy conversion unit, re-circulating the flue gas into said energy conversion unit to form a carbon dioxide enriched stream, and injecting the carbon dioxide enriched stream into the subterranean formation to recover at least one of the gas and oil.

According to another object of one embodiment of the present invention, there is provided a method for enhancing oil and gas production from a subterranean formation containing at least one of gas and oil, comprising providing an energy conversion unit, providing a source of flue gas, re-circulating the flue gas into the energy version unit to form a carbon dioxide enriched stream, and injecting the carbon dioxide enriched stream into the subterranean formation for sequestration of carbon dioxide in the formation.

Conveniently, in terms of the use of fuel for the process, the method can use any economic fuel source, such as natural gas, sour gas, solution gas, diesel fuel, heavy oil, bitumen, vacuum reside, asphaltene, coal, petcoke, biomass or any suitable combustible waste product. For economic reasons, it is preferred that the feedstock for the fuel be a low cost source, such as from a heavy or extra heavy fraction of bitumen or heavy oil, low cost source, such as from a heavy or extra heavy fraction of bitumen or heavy oil, such as atmospheric or vacuum residuum, asphaltene or visbroken residue. These feedstocks are used to create the Multiphase Superfine Atomized Residue (MSAR™) oil in water emulsion fuel. This alternate fuel is emulsified in the continuous water phase of 10 to greater than 35% wt to create an easily managed liquid fuel that has similar burning characteristics as natural gas. The heavy oil is pre-dispersed in water with surfactant chemistry to produce a consistent droplet size. The immediate benefit is that the fuel achieves greater that 99.99% carbon burnout with similar burning characteristics as with natural gas, in terms of flame length and radiant heat flux. The net benefit is that the least valuable fraction of the feedstock is made into a useful fuel that can be directly adapted to a natural gas boiler or furnace as an economically viable replacement for expensive natural gas.

These and other features, aspects and advantages of the present invention will become better understood with regard to the following description and accompanying drawings.

DETAILED DESCRIPTION OF THE PREFERRED EMBODIMENT

For the purpose of the present invention, the following terms are defined below.
GHG refers to green house gas;
FGT refers to flue gas treatment;
FGR refers to flue gas recirculation; HP refers to high pressure;
BFW refers to boiler feed water;
OTSG refers to once through steam generator; and
ECU refers to energy conversion unit.

Figure 1:
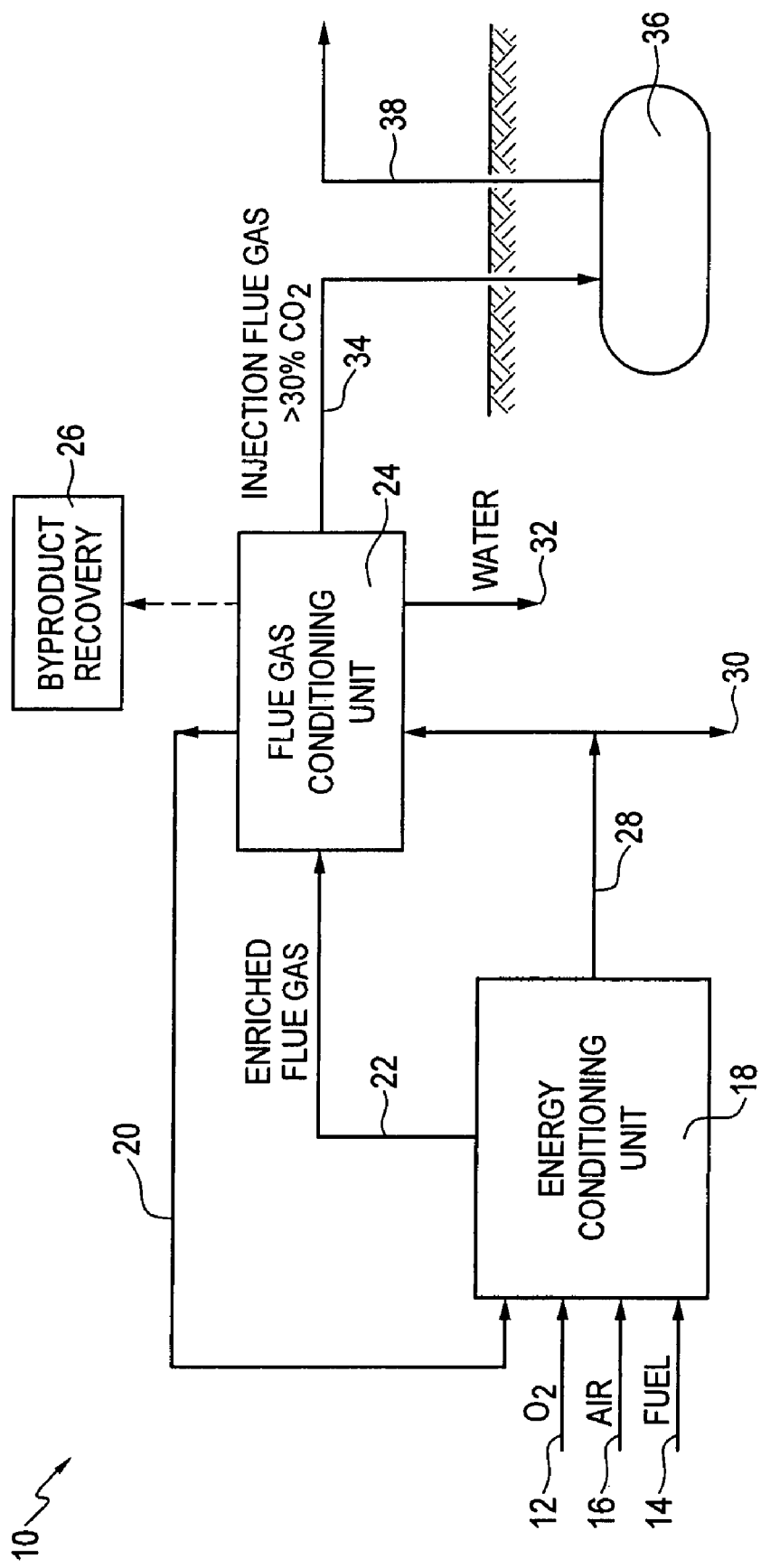
FIG. 1 is a schematic illustration of the overall system of the present invention according to a first embodiment.

Referring now to FIG. 1, shown is a schematic illustration of one possible embodiment of the apparatus to practice the method. Numeral 10 globally denotes the elements.

An air separation unit operation (not shown) in FIG. 1, separates oxygen and nitrogen in an air stream to provide 90% or greater purity oxygen gas 12 for use in the process. This is exemplary; variations are possible depending on the situation. Fuel 14, which may be selected from the non limiting examples of natural gas, sour gas, solution gas, fuel oil, diesel fuel, emulsion fuel, residuum, biomass, coal and petcoke, are mixed with oxygen 12 and 16 forming a fuel mixture for introduction into an energy conversion unit, generically represented by numeral 18. The energy conversion unit may comprise any suitable device such as a simple cycle, conventional or super critical steam generator circuit with a suitable steam turbine electric generator or steam turbine driven compressors. Other suitable arrangements incorporate a modified gas turbine cogen simple or combined unit with a heat recovery steam generator (HRSG). A further possibility may be a diesel slow speed engine driving an electric generator and/or gas compressor. The specific unit or combination of units will depend upon the design parameters.

As an example, for specific hydrocarbon production sites, a typical electric generation facility would be sized in the 10 to 500 mega watt range or in phases of this size suitable to meet power demands and create sufficient carbon dioxide injection volumes for the enhanced hydrocarbon recovery. The steam driven devices noted above may also include once through steam generators (OTSG), conventional packaged boilers, conventional utility boilers and circulating fluid bed boilers (CFBs) dimensioned to attend to the steam requirement for the electric power generation.

Figure 3:
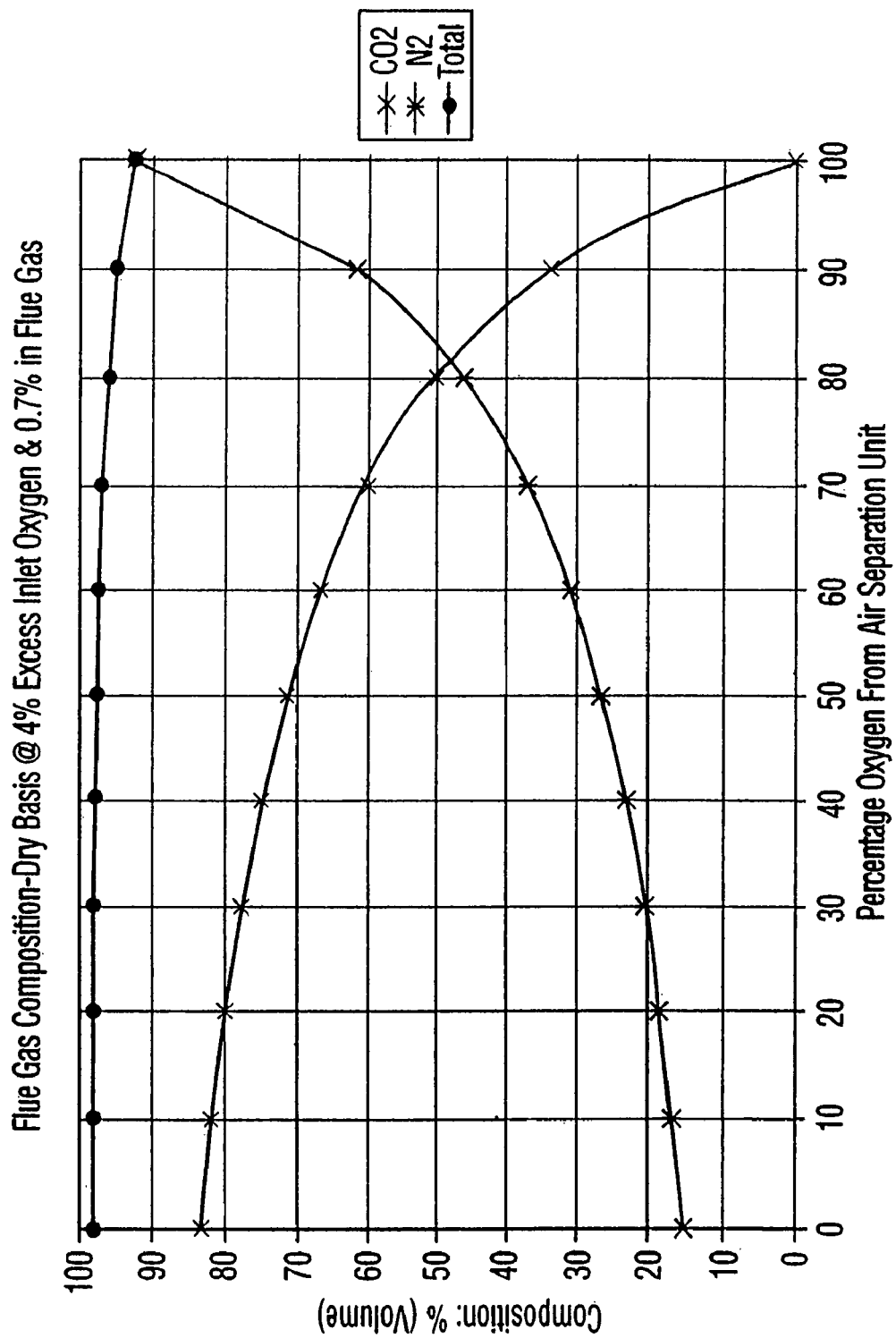
FIG. 3 is a graphical representation of the oxygen requirement for flue gas carbon dioxide enrichment on a dry basis.
Figure 4:
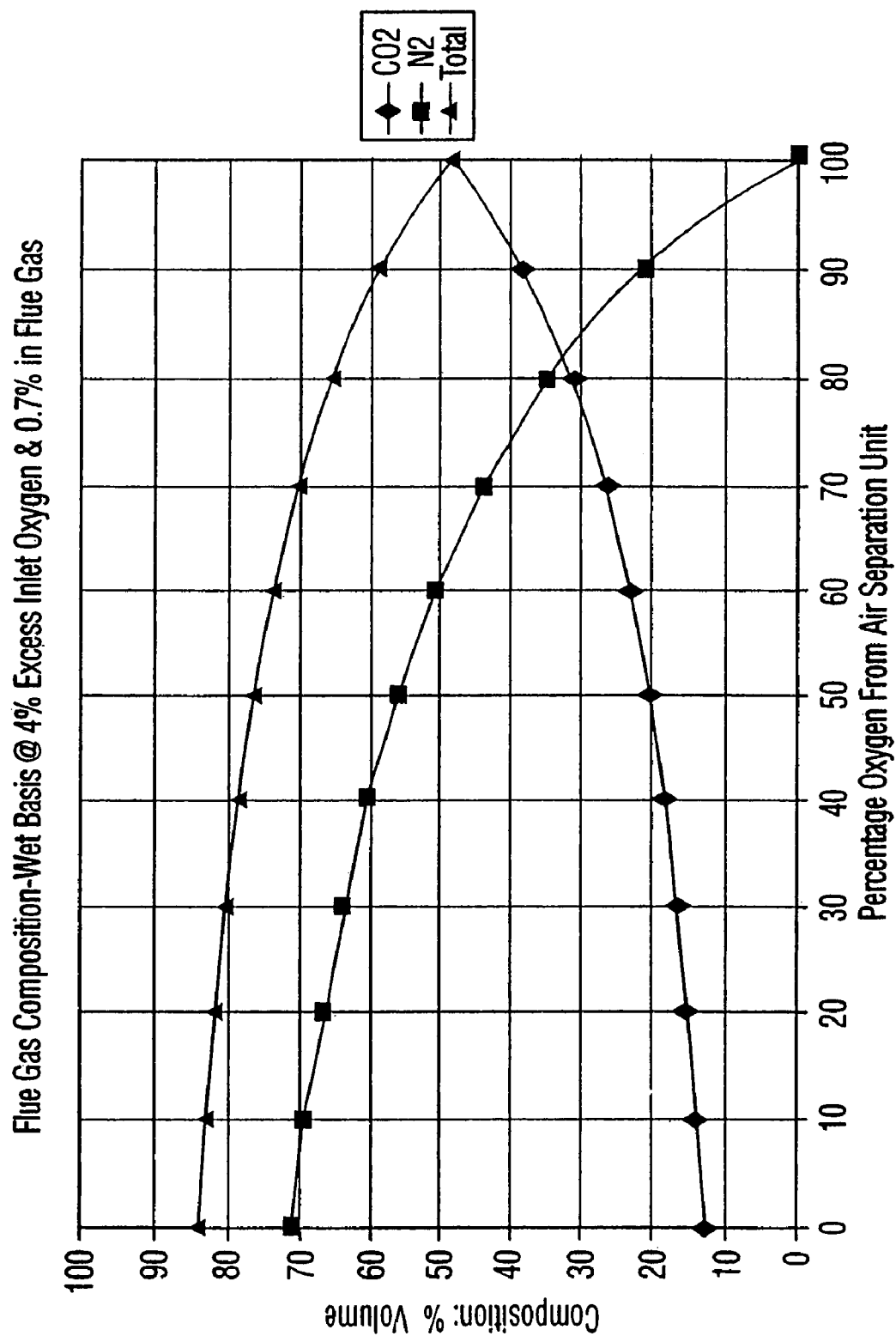
FIG. 4 is a graphical representation of the oxygen requirement for flue gas carbon dioxide enrichment on a wet basis.

A flue gas recirculation circuit 20 is incorporated into the system for carbon dioxide enrichment. It is well known that a benefit of FGR is the reduction of nitrogen gas in the flue gas and thus the formation of NOx compounds with the concomitant benefit of an increase in the concentration of carbon dioxide in the flue gas. The graphical representations in FIGS. 3 and 4 depict compositional change for the flue gas for variations in the oxygen content. As an example, the graph in FIG. 3 illustrates the clear advantage in carbon dioxide quantity attributed to a high concentration of oxygen resulting from the cycling process through the energy conversion unit. FIG. 4 demonstrates the same data on a wet basis.

As will be appreciated with an increased oxygen to combustion air ratio for a fixed oxygen concentration, the temperature can become elevated to the extent that design parameters of the boiler/heat equipment can be exceeded. To counteract this limitation, the flue gas recirculation circuit can recirculate a combustion stream back to the energy conversion unit 18 for thermal quenching. As will be appreciated, the quantity of flue gas recirculation will depend on the operational parameters of the equipment. This immediately results in significant advantages, namely:

a) enhanced boiler efficiency and operation;
b) greater ease for the designer regarding retrofitting of existing plants for the process without extensive re-engineering or equipment replacement;
c) improved thermal combustion efficiency;
d) reduced NOx emissions; and
e) improved safety.

Returning to the overall process, the stream 22 exiting conversion unit 18, now an enriched flue gas stream, may then be treated in any number of steps, globally denoted by flue gas conditioning unit numerically represented by 24. Generally, the flue gas, depending on the assay of the fuel may contain in addition to $CO_2$, such major components as CO, $H_2$, excess $O_2$, $SO_2$, $SO_3$, NOx, $N_2$, soot, ash, water vapour metals, etc. The treatment may involve departiculation or flyash removal, flue gas dehydration, quenching, flue gas desulfurization and compression, NOx removal, byproduct recovery or any combination of these.

In addition, based on economic merit, additional methods may be used to recover the useful and valuable byproducts denoted by numeral 26, such as CO, $H_2$, $SO_2$, water and heavy metals for other commercial ventures common to those skilled in the art. As a further clarification, the energy conversion unit 18 may be operated with combustion of the fuel in a sub-stoichiometric, stoichiometric or excess oxygen mode. Different byproducts can be generated in the enriched flue gas depending on the specific requirements. Typically, it is preferred that the mode be near stoichiometric to produce the highest concentration of carbon dioxide in the enriched flue gas. In some instances, it may be desirable to utilize the byproducts in flue gas design.

The useful energy 28 generated by the energy conversion unit 18 as one example, may be electric power or direct drive to compress the enriched flue gas and/or combustion air/ oxygen in the operations of the flue gas conditioning unit 24. Depending on the design balance of the components and the required volume of the enriched injections flue gas, excess energy 30 may be created and sold to commercial markets as excess electric power.

Residual water 32 discharged from the flue gas conditioning unit 24 may be reused in other processes. Conditioned injection flue gas is transported via line 34 into the subterranean formation 36. The injection flue gas may contain greater than 30% by volume carbon dioxide; however, this will change depending upon the composition of the formation 36 according to FIG. 2 and FIG. 3.

Formation 36 may contain any one or all of oil, bitumen, heavy oil, natural gas, natural gas liquids or may be used purely for flue gas sequestration.

The recovered hydrocarbons leave formation 36 via line 38 and may be subjected to further processing. This is an optional step.

The composition of the treated flue gas is variable and will depend on the specific nature of the content and the physical and chemical properties of the formation. It will be appreciated that the treated flue gas composition may require compositional change dynamically as the formation changes over time. As an example, the composition could be 50% carbon dioxide and 50% nitrogen to 70% carbon dioxide and 30% nitrogen through to 100% carbon dioxide.

Figure 2:
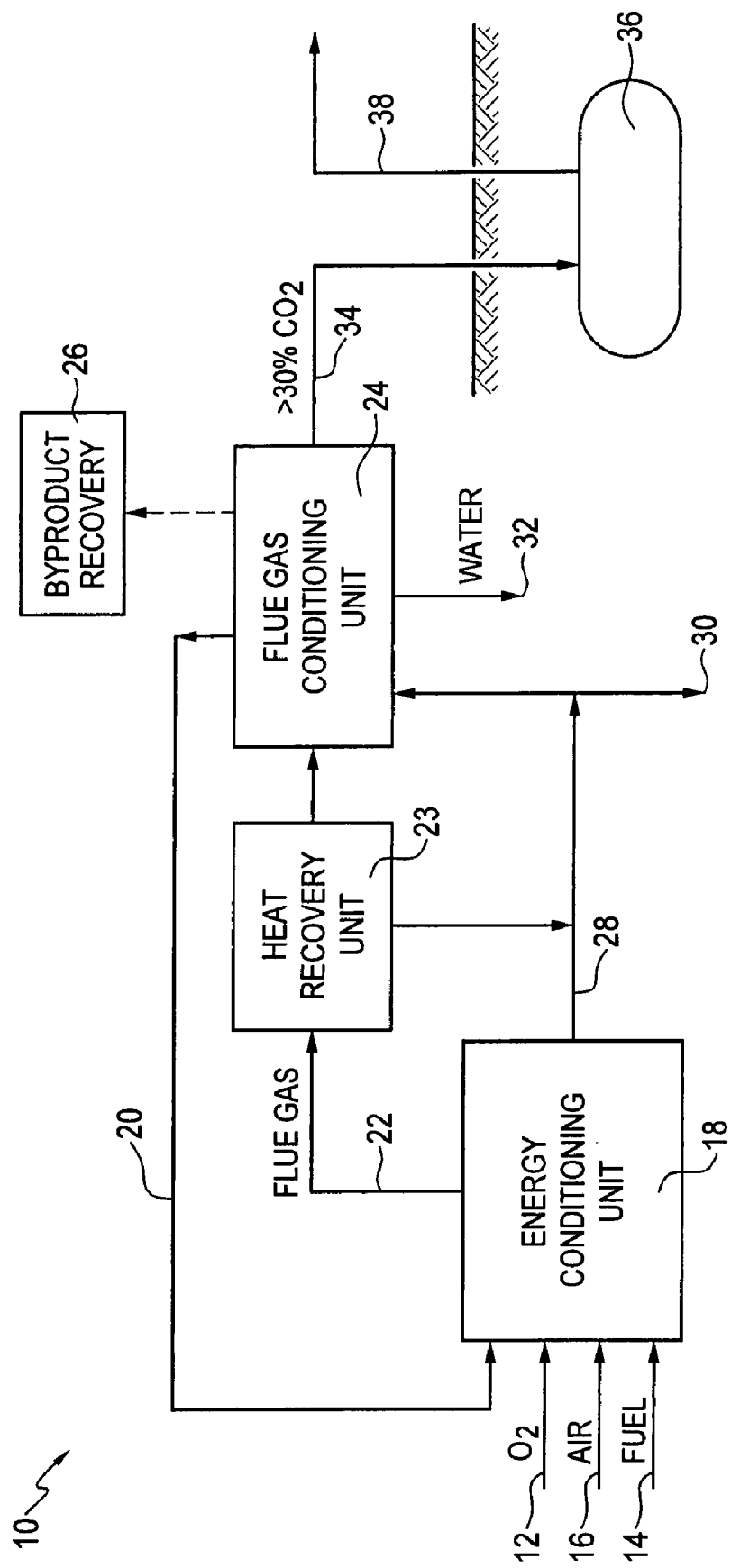
FIG. 2 is a schematic illustration of the overall system of the present invention according to a second embodiment.

Turning to FIG. 2, shown is a variation in the overall process, where a heat recovery unit 23 is interposed in the circuit between the energy conversion unit 18 and the flue gas conditioning unit 24. In this variation the heat recovery unit 23 is employed to balance the energy produced and maximize the thermal efficiency of the combined cycle method. This arrangement provides for the use of prime movers, e.g. gas turbines and diesel engines. The heat recovery unit 23 may be employed to generate additional steam for electric power generation or be used to preheat water, combustion air or oxygen to elevate the energy efficiency of the method.

The technology set forth has the advantage of enhancing recovery of the values, originally in place, a minimum of 5%;

this represents a vast increase in the economics of recovery. This is further augmented by the generation of excess electrical power and/or stream.

In summary, by unifying the concepts of synthesizing an enriched flue gas for injection into a hydrocarbon formation the following additional advantages are realized:

i) Particulate emission reduction;
ii) improved carbon burnout;
iii) a reduction of N content in flue gas resulting in a volume reduction greater than 60%;
iv) economic benefit from increased hydrocarbon production;
v) the absence of pipelines and compression devices for the flue gas;
vi) self sufficing by generation of electrical power and/or stream for process control;
vii) self generation of low cost fuels, such as MSAR™ emulsion fuel asphaltenes, residuums; and
viii) enhanced energy conversion unit efficiency by use of excess $O_2$.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for enhancing oil and gas production from a subterranean formation containing at least one of gas and oil, comprising:

providing an energy conversion unit where combustion of a fuel source is effected and a power output is generated;

recovering flue gas from said energy conversion unit;

circulating flue gas into said energy conversion unit to form a carbon dioxide enriched stream;

maintaining the combustion of said fuel in said energy conversion unit to stoichiometrically maximize carbon dioxide content in said enriched stream;

conditioning flue gas recovered from said energy conversion unit prior to circulation to said energy conversion unit by removing one or more components other than carbon dioxide, thus obtaining a conditioned flue gas with augmented content by volume of carbon dioxide; and injecting said carbon dioxide enriched stream into said subterranean formation to recover at least one of said gas and oil.

2. The method as set forth in claim 1, wherein re-circulated flue gas reduces the temperature of said energy conversion unit.

3. The method as set forth in claim 1, wherein said carbon dioxide enriched stream is treated in at least one conditioning unit operation to modify said carbon dioxide enriched stream prior to injection.

4. The method as set forth in claim 3, wherein said conditioning comprises a unit operation selected from the group consisting of departiculation, flue gas desulfurization, flue gas quench, flue gas dehydration, flue gas compression, $NO_x$ removal and combinations thereof.

5. The method as set forth in claim 1, wherein carbon dioxide is sequestered in said formation.

6. The method as set forth in claim 1, further including the step of recovering energy generated from said energy conversion unit.

7. The method as set forth in claim 1, further including the step of selectively recovering byproducts from said method.

* * * * *